(12) United States Patent
Yan et al.

(10) Patent No.: US 8,171,310 B2
(45) Date of Patent: May 1, 2012

(54) FILE SYSTEM FILTER AUTHENTICATION

(75) Inventors: Mei Yan, Cupertino, CA (US); Chieh-Hao Yang, Sunnyvale, CA (US); Junzhi Wang, San Jose, CA (US); Paul McAvoy, Los Gatos, CA (US); Bahman Quwami, San Jose, CA (US); Farshid Sabet-Sharghi, Los Altos Hills, CA (US); Patricia Dwyer, San Carlos, CA (US); Po Yuan, Milpitas, CA (US)

(73) Assignee: SanDisk Technologies Inc., Plano, TX (US)

( * ) Notice: Subject to any disclaimer, the term of this patent is extended or adjusted under 35 U.S.C. 154(b) by 1130 days.

(21) Appl. No.: 11/963,960

(22) Filed: Dec. 24, 2007

(65) Prior Publication Data

US 2009/0164779 A1    Jun. 25, 2009

(51) Int. Cl.
*G06F 21/00* (2006.01)
(52) U.S. Cl. .......................................... 713/193; 726/26
(58) Field of Classification Search .................. 713/164, 713/165, 193, 189; 726/26, 29
See application file for complete search history.

(56) References Cited

U.S. PATENT DOCUMENTS

| | | | |
|---|---|---|---|
| 6,161,185 A * | 12/2000 | Guthrie et al. | 726/5 |
| 7,003,674 B1 * | 2/2006 | Hamlin | 713/193 |
| 2002/0112083 A1 | 8/2002 | Joshi | |
| 2007/0039055 A1 * | 2/2007 | Plastina et al. | 726/26 |

* cited by examiner

*Primary Examiner* — Edward Zee
(74) *Attorney, Agent, or Firm* — Toler Law Group, PC (57) ABSTRACT

A software entity on a host device attempting to access protected content in a secure memory device must be authenticated using a challenge/response authentication mechanism before the secure file system can be accessed. A file system filter determines whether requested content is protected. If the content is protected, the file system filter provides a challenge to the software entity and generates a file system filter response using the same challenge. The software entity must then send a software entity response using the challenge to the file system filter. If the file system filter determines that the software entity response matches the file system filter response, the software entity is allowed to access the protected content through a secure file system installed on the host device for the memory device.

19 Claims, 10 Drawing Sheets

FILE SYSTEM FILTER AUTHENTICATION

BACKGROUND

1. Field

The present invention relates to technology for non-volatile storage.

2. Description of the Related Art

Semiconductor memory has become more popular for use in various electronic devices. For example, non-volatile semiconductor memory is used in cellular telephones, digital cameras, mobile media players, personal digital assistants, mobile computing devices, non-mobile computing devices and other devices.

Protecting content stored on non-volatile semiconductor memory devices has become an important feature, especially concerning protection for copyrighted material. For example, a user may purchase copyrighted content, such as music, through an electronic device. Content owners typically intend for only the purchaser to use the content and may require that the purchased content be played only on authorized devices, such as the device used to purchase the content.

Securely storing information to protect unauthorized use of protected content can be performed using a variety of protection techniques, such as encryption. An application on a device that tries to access encrypted content must decrypt the content using an encryption key before that content can be read. An application authorized to access the encrypted content will have the appropriate encryption key for decrypting the content. Unauthorized applications may still be able to access the encrypted content, but without the appropriate encryption key, the unauthorized application may not be able to read the content. However, if an application somehow obtains the encryption key, the unauthorized application will be able to read the protected content. Thus, there is a need for a simplified and secure way of preventing an unauthorized application or application launcher on an electronic device from accessing protected content on a memory device.

SUMMARY

The technology described herein pertains to authentication of an application, application launcher, or other software entity on a host device to prevent unauthorized accessing to protected content in a secure removable non-volatile memory device. One example of this authentication includes a challenge/response authentication of a software entity on a host device. When the software entity requests protected content stored on the memory device, a file system filter installed on the host device for the memory device sends a challenge to a software entity, receives a software entity response to the challenge from the software entity, calculates a file system filter response using the same challenge sent to the software entity, and allows the software entity to access the content if the responses match.

One embodiment includes installing a file system filter for a secure removable memory device on a host device. The file system filter sends a challenge to a software entity on the host device, receives a software entity response in response to the challenge, calculates a file system filter response using the challenge, and provides access to first content on the memory device if the software entity response matches the file system filter response.

One embodiment includes requesting content stored on a secure removable memory device, where the content is requested by a software entity on a host device. The process also includes receiving a challenge from first code installed on the host device for the memory device including receiving the challenge at the software entity, where the first code intercepts access to content through a host file system on the host device. The process further includes generating a software entity response using the challenge, where the generating is performed by the software entity. The software entity response is sent to the first code and content is received by the software entity if the software entity response matches a first code response generated by the first code using the same challenge.

One embodiment includes receiving a request for first content stored on a secure removable memory device, where the request is received from a software entity on a host device. The process also includes controlling whether the first content should be accessed using a host file system on the host device or a secure file system installed on the host device, where the controlling is performed by first code installed for the memory device. The process further includes providing access to the first content through the host file system if the first content is not protected in said memory device, where the providing is performed by the first code. If the first content is not protected in the memory device, a challenge is sent to the software entity using the first code. A software entity response to the challenge is received from the software entity, a memory device response is generated by the first code, and the first code provides access to the first content through the secure file system if the software entity response matches the memory device response.

One embodiment includes a memory device and a host processing system in communication with the memory device. The memory device includes one or more partitions that store unprotected content and protected content. The host processing system has one or more processors that control whether requested content stored on the memory device should be accessed using a host file system on the host processing system or a secure file system installed on the host processing system. The one or more processors send a challenge to a software entity on the host processing system if the requested content is protected, receive a first response from the software entity in response to the challenge, calculate a second response using the challenge, and provide access to the requested content through the secure file system if the first response matches the second response.

One embodiment is a non-volatile storage device that includes a communication interface, non-volatile storage elements in a secure removable memory device and one or more processors on the memory device. The non-volatile storage elements include one or more partitions that store processor readable code. The processor readable code programs one or more processors on the host device to intercept access to content stored on the memory device, send a challenge to a software entity on the host device, receive a first response to the challenge from the software entity, calculate a second response using the challenge, and provide access to requested content stored on the one or more partitions if the first response matches the second response. The one or more processors on the memory device access the requested content and sent the requested content to the host device through the communication interface.

One embodiment includes one or more processor readable storage devices having processor readable code embodied on the processor readable storage devices, where the processor readable code is for programming one or more processors to perform a method. The method includes installing a file system filter for a secure removable memory device to a host device, sending a challenge from the file system filter to a software entity on the host device, receiving a software entity response at the file system filter in response to the challenge, calculating a file system filter response at the file system filter using the challenge, and providing access to first content on the memory device if the software entity response matches the file system filter response.

DETAILED DESCRIPTION

Figure 1:
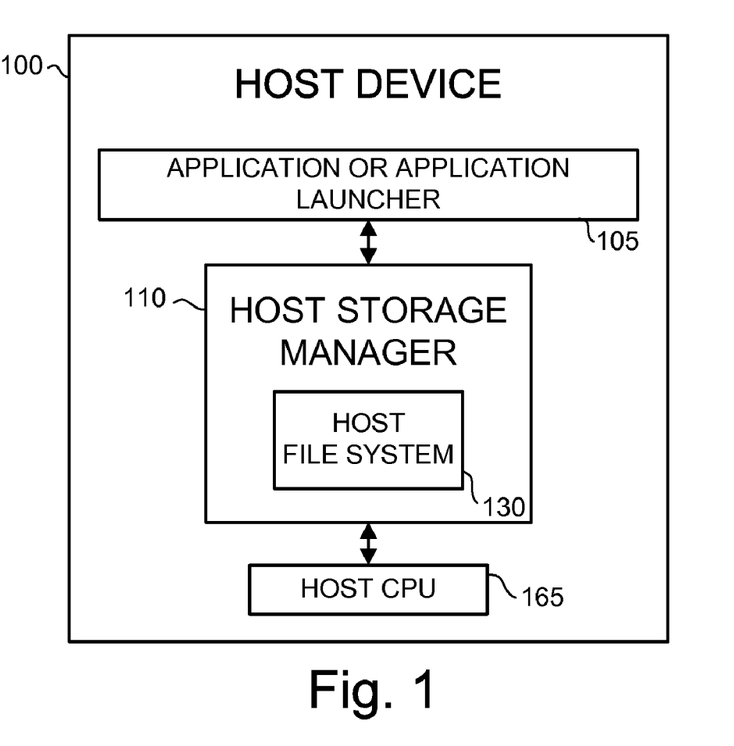
FIG. 1 is a block diagram of host device components before loading libraries for a secure memory device.

One example of a host device 100 is depicted in FIG. 1. A host device 100 can be any electronic device using non-volatile memory, such as a cellular telephone, digital camera, mobile media players, personal digital assistant, mobile computing device, non-mobile computing device and other devices.

FIG. 1 shows one embodiment of the components in the host device 100 that are used for access and storage of content on the host device 100. Typically, a user of a host device 100 assesses content on the host device 100 through a software component such as an application or application launcher 105. Examples of applications on the host device 100 include media players, calendars, address books, etc. that are saved on the host device 100. An application launcher is an executable on the host device used to launch an application (i.e. media players, game players, GPS, etc.) stored in a different location from the executable on the host device 100. For example, an application launcher may be used to launch a media player application that is saved within the host device in a different part of memory for the host device 100 or on a peripheral device connected to the host device 100. Content accessed or saved using an application or application launcher 105 can include content such as applications, media, scheduling information, or contact information, etc.

The application or application launcher 105 uses a host storage manager 110 on the operating system for the host device 100 to access or store content on the host device 100 or any other peripheral devices, such as a removable memory device. The host storage manager 110 is a software component on the operating system that controls access and storage functions for the host device 100, including access and storage within the host device 100 and between any peripheral devices, as will be explained in more detail below.

FIG. 1 shows the host storage manager 110 and the host file system 130, which is a component that the host storage manager 110 manages. The host storage manager 110 uses the host CPU 165 to access the host file system 130. The host file system 130 is stored in memory on the host device 100 and is used to locate and store content stored on the host device 100 and in any peripheral devices. When a user requests content from the host device 100, the host storage manager 110 will use the host file system 130 to locate the content. When a user requests that content be stored, the host storage manager 110 will use the host file system 130 to store the content in the proper location.

Figure 2:
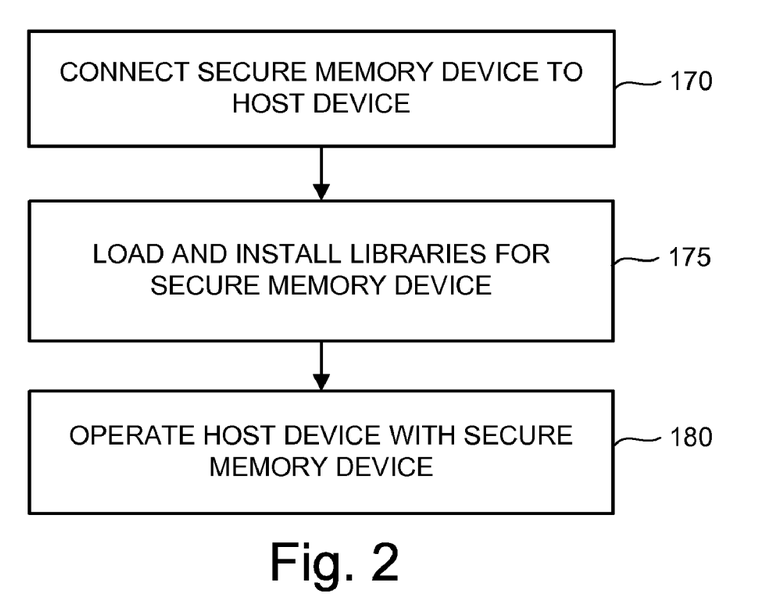
FIG. 2 is a flow chart describing a process for loading a secure memory device into a host device.

FIG. 2 is a flow chart describing how a secure memory device can be used with a host device. In one embodiment, the secure memory device is a removable non-volatile flash memory storage device for storing content that either may be stored in a secure partition of the secure memory device or may be stored in a public partition of the secure memory device. The secure memory device protects against unauthorized access of content stored in the secure partition of the secure memory device. The secure memory device may also protect against unauthorized access of content stored in the public partition of the secure memory device if the content is protected. Content is protected in the secure memory device if the content is encrypted. Content is unprotected in the secure memory device if the content is unencrypted and is stored in a public partition. A host device may access and store content on the secure memory device if the host device has the proper authorizations associated with the content, such as authorizations that allow the content to be encrypted or decrypted. More detail on how the secure memory device protects content will be described below.

In step 170 of FIG. 2, the secure memory device is connected to the host device. When the secure memory device is connected to the host device, software libraries for operating the secure memory device are loaded and installed onto the host device (step 175). These libraries are stored on a public partition of the secure memory device and contain software used to program the host CPU 165 on the host device 100 to operate the secure memory device so that protected content may not be accessed without the proper authorizations. The libraries will be referred to collectively as a file system filter library because they are dynamic link libraries that take control from the file system on the host device 100 in order to properly operate the secure memory device 145 on the host device 100. The software from the file system filter library is loaded and installed onto the operating system for the host device 100. The file system filter library for operating the secure memory device discussed in more detail below. Once the file system filter library is properly loaded and installed onto the host device 100, the host device 100 can be operated using the secure memory device (step 180). Note that in some embodiments, step 175 is only performed for a particular secure memory device during the first time that the particular secure memory device is connected to the host device 100. Subsequent times that the particular secure memory device is connected to the host device 100, the libraries need not be loaded and installed since they will already be on the host device 100. In other embodiments, the file system filter library is loaded and installed every time the secure memory device is connected to the host device 100.

In one embodiment, the file system filter library for operating the secure memory device is loaded and pre-installed on the host device before the operating system is installed on the host device. In this case, the file system filter library is stored on embedded memory for the host device and can be used by activating or selecting the library through the operating system. Therefore, step 175 need not be performed as part of the process of FIG. 2. In another embodiment, the libraries for operating the secure memory device are integrated into the host operating system for the host device. The libraries are loaded and pre-installed on the host device after the operating system for the host device has been installed.

Figure 3:
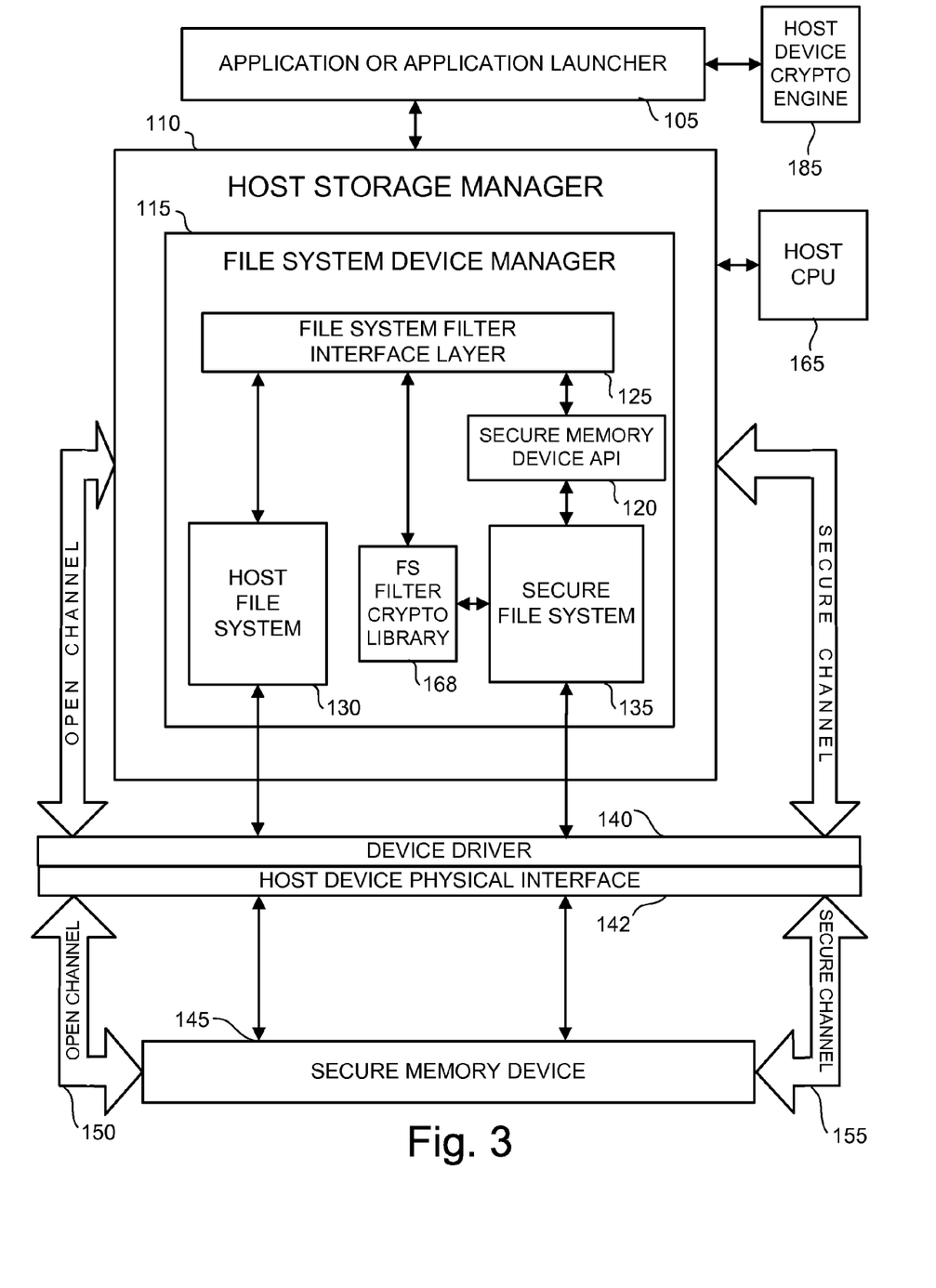
FIG. 3 is a block diagram depicting components of a host device and a secure memory device.

FIG. 3 shows one example of a host device that operates with a secure memory device after the file system filter library has been properly loaded and installed. The host device 100 is physically connected to the secure memory device 145 through the physical interface 142. The application or application launcher 105, the host CPU 165, the host storage manager 110, and the host file system 130 are the same software components on the host device 100 shown in FIG. 1. The host device crypto engine 185 is also a component on the host device 100 and is used to perform encryption within the host device for authenticating applications or application launchers. The file system device manager 115 is a software component on the host device 100 and is used to manage content access and storage for peripheral devices, such as the secure memory device 145. The file system device manager 115 uses the secure memory device API 120, the file system filter interface layer 125, the host file system 130, the file system (FS) filter crypto library 168, and the secure file system 135 to manage content access and storage for the secure memory device 145. The secure memory device API 120, the file system filter interface layer 125, the file system filter crypto library 168, the secure file system 135, and the device driver 140 are software components loaded and installed onto the host device from the file system filter library as described in step 175 of FIG. 2. The open channel 150 and the secure channel 155 are the data buses used to transfer content between the host device 100 and the secure memory device 145.

The secure memory device 145 controls access to and storage of content using software installed on the host device 100 for the secure memory device 145. The software includes the file system filter library described in step 175 of FIG. 2. The file system filter library loaded and installed on the host device are dynamic link libraries (DLL) that can be integrated into the operating system on the host device. The DLLs provide hooks into the host storage manager 110 for file operations of the secure memory device 145. For example, code from the memory device DLLs can be inserted in the call chain for calling the host file system 130 so that the host CPU 165 (shown in FIG. 1) can be programmed to control how content is accessed and stored. In FIG. 3, the file system filter interface layer 125, the secure memory device API 120, the file system filter crypto library 168, the secure file system 135, and the device driver 140 are components that are provided to the host device through the file system filter DLL.

A user may access content stored in the secure memory device 145 through an application or application launcher 105 on a host device, as shown in FIG. 3. For protected content stored in the secure memory device, the application or application launcher 105 first needs to be authenticated before the content can be accessed, as described in more detail below.

The application or application launcher 105 uses the host storage manager 110 on the operating system for the host device to access or store content in the secure memory device 145. The host storage manager 110 controls access and storage functions for the host device, including access and storage within the host device and the secure memory device 145.

Typically, the host storage manager 110 controls access and storage functions for the host device or any peripheral devices using a host file system 130 on the operating system for the host device, as discussed in FIG. 1. However, for the secure memory device 145, a file system device manager 115 uses a file system filter interface layer 125 to control access and storage functions on the host device by using either the host file system 130 or a secure file system 135 for the secure memory device 145. The secure file system 135 is installed on the host device 100 for the secure memory device 145 and is the file system for the protected content stored in the secure memory device 145.

Software for the file system filter interface layer 125 is loaded and installed as part of the file system filter DLL loaded and installed in step 175 of FIG. 2. The file system filter interface layer 125 programs the host CPU 165 to intercept control of the host file system by inserting a call for file system filter interface layer 125 functions before a host file system 130 would typically be called, as described in FIG. 1. The file system filter interface layer 125 programs the host CPU 165 to first determine whether access and storage functions should be performed using the host file system 130 for the host device or the secure file system 135 for the secure memory device 145. When a user, through an application or application launcher 105, requests access to content, the file system filter interface layer 125 determines whether the requested content is protected in the secure memory device 145. This is performed by accessing a reference table for protected content stored in the secure memory device 145. The reference table is also part of the installed file system filter DLL and may point to a header for the protected content. This header is stored with the protected content and contains information associated with the protected content, such as authentication algorithms, content encryption keys (CEK) for encrypting and decrypting the content, and content metadata, which may indicate what type of content is stored.

If the file system filter interface layer 125 determines that the content is unprotected, the file system filter 125 will locate the content using the host file system 130. The host file system 130 can be any standard file system used in an operating system, such as FAT12, FAT16, FAT32, NTFS, etc.

If the file system filter interface layer 125 determines that the content is protected, the application or application launcher 105 attempting to access the content for the user must be authenticated with the file system filter interface layer 125. Details regarding authentication will be discussed in more detail below. If the application or application launcher 105 has been successfully authenticated, the file system filter interface layer 125 will locate the content using the secure file system 135. The secure file system 135 can be any standard file system, such as FAT12, FAT16, FAT32, NTFS, etc.

When a user, through the application or application launcher 105, requests storage of content that should be unprotected, the file system filter interface layer 125 will use the host file system 130 to store the content. If the user requests storage of content that should be protected in the secure memory device 145, the file system filter interface layer 125 will use the secure file system 135 to store the content.

The secure memory device API (Application Program Interface) 120 in the file system device manager 115 is used to interface the secure memory device 145 with the application or application launcher 105 when protected content is accessed or stored. The secure memory device API 120 is part of the libraries that are installed and may be called by the application or application launcher 105 when the application or application launcher 105 is successfully authenticated. The secure memory device API 120 is the interface bridge between the file system filter interface layer 125 and the secure file system 135.

Once the content is located or filed using either the host file system 130 or secure file system 135, the content can be accessed or stored on the secure memory device 145 in the appropriate location using the device driver 140 on the host device. This is performed through the physical interface 142 that physically connects the host device 100 and the secure memory device 145. The content may be accessed or stored using a secure channel 155 or an open channel 150. The file system filter interface layer 125 determines whether the content should be transferred between the secure memory device 145 and the host device using a secure channel 155 or an open channel 150. A session key is an encryption key used to encrypt content before it is transferred between the host device and the secure memory device. If content does not need to be transferred through a secure channel, there may be no session key associated with the content, or the session key associated with that content may indicate that no encryption is needed. For example, the session key for content that does not require a secure channel may be '0.'

If the content is associated with a session key indicating that the content should be transferred using a secure channel 155, the content will be encrypted using the session key before it is transferred through the secure channel 155. Once the encrypted content is transferred, the content will be decrypted using the same session key. The content is encrypted or decrypted on the host device 100 using the file system filter crypto library 168. The file system filter crypto library 168 contains a random number generator and cryptographic functions for encryption, such as symmetric encryption (i.e. AES, DES, 3DES, etc.), cryptographic hash functions (i.e. SHA-1, etc.), asymmetric encryption (PKI, key pair generation, etc.), or any other cryptography methods. The secure memory device 145 has its own crypto engine for encryption on the secure memory device 145 before or after transferring content, as will be explain in more detail for FIG. 4. If the session key indicates that the content should be transferred using an open channel 150, the content is transferred without encrypting the content.

For host devices that do not have the file system filter DLL installed, a device may be able to access content stored in a public partition. If the content is protected, although the device may be able to access the content, the device will not be able to read the content if it is encrypted. If the content is stored in a secure partition, the device cannot access the content.

Figure 4:
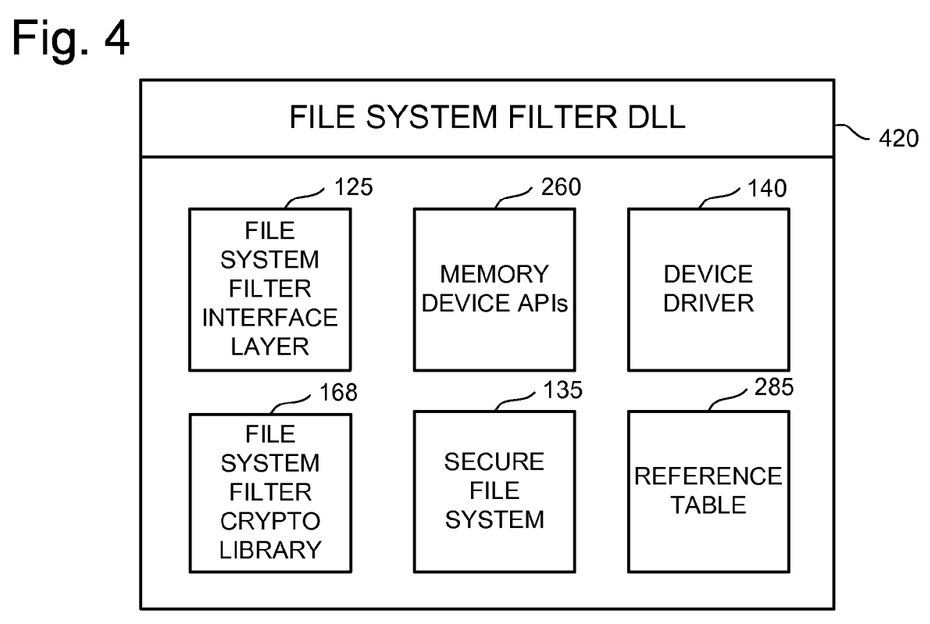
FIG. 4 is a block diagram of a file system filter library that contains software for operating a secure memory device on a host device.

FIG. 4 shows an example a file system filter DLL 420 that is loaded and installed on the host device (e.g. step 175 of FIG. 2). However, software for operating the secure memory device 145 is not limited to that shown in FIG. 4. The file system filter DLL 420 in FIG. 4 contains the software for the file system filter interface layer 125, memory device APIs 260, the device driver 140, the file system filter crypto library 168, the secure file system 135, and the reference table 285.

The file system filter interface layer 125 is described in FIG. 3. The file system filter interface layer 125 is installed on the host device to provide hooks into the host storage manager 110 so that the host CPU 165 can be programmed to control how content on the secure memory device 145 is accessed and stored. The code for the file system filter interface layer 125 hijacks the host file operations on the host device 100 so that either the host file system 130 or the secure file system 135 can be used for access and storage.

The memory device APIs 260 are the APIs loaded and installed on the host device 100 for use by applications or application launchers on the host device 100 once the applications or application launchers are successfully authenticated, such as the application or application launcher 105 in FIG. 3. These APIs are used to interface an application or application launcher with the secure file system 135 for access to protected content on the secure memory device 145. The memory device APIs installed for an application or application launcher may be specific to that particular application or application launcher. An API for one application or application launcher may be different than an API for another application or application launcher. An application or application launcher that is successfully authenticated through the file system filter 125 may access protected content in the secure memory device 145 through a secure memory device API 120.

The device driver 140 is the software for the device driver 140 in FIG. 3. The device driver 140 can be loaded and installed on the host device as described in step 175 of FIG. 2 or pre-installed on the operating system for the host device 100 either before or after the operating system is installed on the host device.

The file system filter crypto library 168 is the library containing the cryptographic schemes that may be used for encrypting or decrypting content for a secure channel 155. The cryptographic schemes can be any known schemes, such as AES, DES, 3DES, SHA-1, PKI, key pair generation, etc.

The secure file system 135 is the file system containing filing data for accessing the protected content in the secure memory device 145, as described in FIG. 3.

The reference table 285 is the table that points to the header for protected content stored in the secure memory device 145. The header contains information associated with the protected content stored on the secure memory device 145. As explained above, the header may contain information such as authentication algorithms, the permissions associated with the content, which applications or application launchers may access the content, CEKs, session keys, etc.

Figure 5:
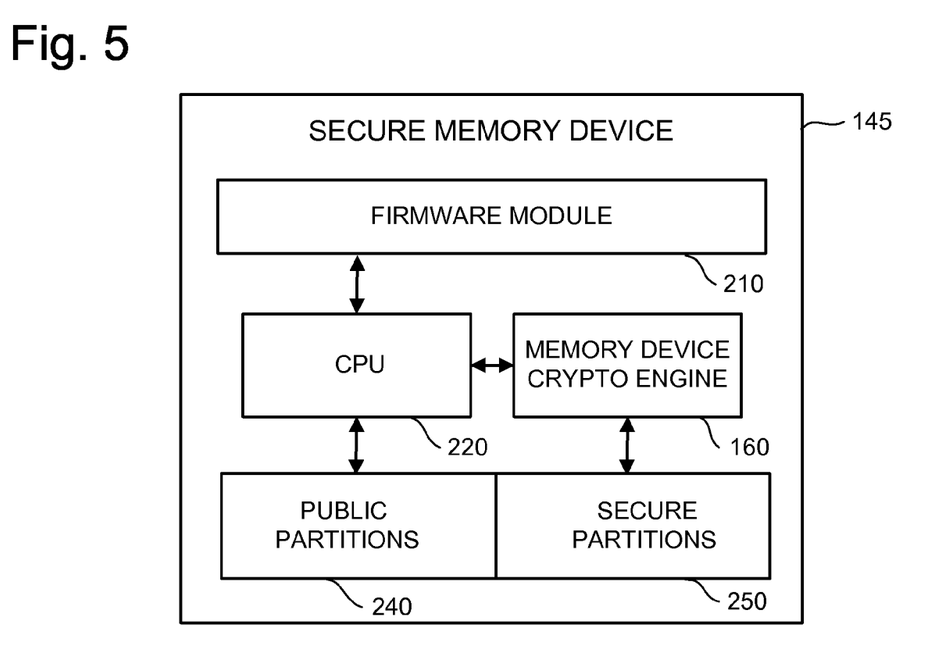
FIG. 5 is a block diagram depicting one embodiment of a secure memory device.

FIG. 5 depicts one embodiment of the secure memory device 145. The secure memory device 145 contains a firmware module 210, a CPU 220, a memory device crypto engine 160, public partitions 240, and secure partitions 250. The firmware module 210 accesses and stores content in either the public partitions 240 or the secure partitions 250 using the CPU 220. The memory device crypto engine 160 is used to encrypt or decrypt the accessed or stored content within the secure memory device 145.

The firmware module 210 contains the hardware and software for controlling the access and storage of content on the secure memory device 145 for the secure partitions 250 and the public partitions 240. The firmware module programs the CPU 220 to perform the access and storage functions, such as determining from which portion of memory content should be accessed or stored and whether the content is protected. More details regarding the firmware module 210 will be discussed below in the description for FIG. 6.

The public partitions 240 are memory partitions of the secure memory device 145 that are viewable by a user and detectable by the host device. The secure memory device 145 may have one or more public partitions. The public partitions 240 may contain public content that is openly accessible to a user or the host device 100. The public partitions 240 may also store protected content that is encrypted using a CEK. The CEK is stored in the content header containing information associated with the content. Public content may also be stored without encrypting the content.

The secure partitions 250 are hidden memory partitions of the secure memory device 145 that are not viewable by a user and are not detectable by the host device. The secure memory device 145 may have one or more secure partitions. The secure partitions 250 may contain protected content that is not openly accessible to the user or the host device. The protected content may be encrypted using a CEK. Content stored in the secure partitions 250 is accessible to authenticated applications or application launchers having the appropriate permissions for accessing the content. The CEK and the permissions associated with the content are stored in the content header containing information associated with the content. In one embodiment, public partitions 240 and secure partitions 250 are stored in a flash memory device that includes a controller and one or more flash memory arrays.

Because the secure partitions 250 are hidden partitions undetectable by a user or the host device, the secure partitions 250 may contain the software for operating the secure memory device 145 on the host device, including rights objects, application credentials, etc.

The memory device crypto engine 160 is used to encrypt or decrypt the content using the CEK or the session key within the secure memory device 145. The memory device crypto engine 160 contains a random number generator and a cryptographic processor that may support encryption methods such as symmetric encryption (i.e. AES, DES, 3DES, etc.), cryptographic hash functions (i.e. SHA-1, etc.), asymmetric encryption (PKI, key pair generation, etc.), or any other cryptography methods.

Figure 6:
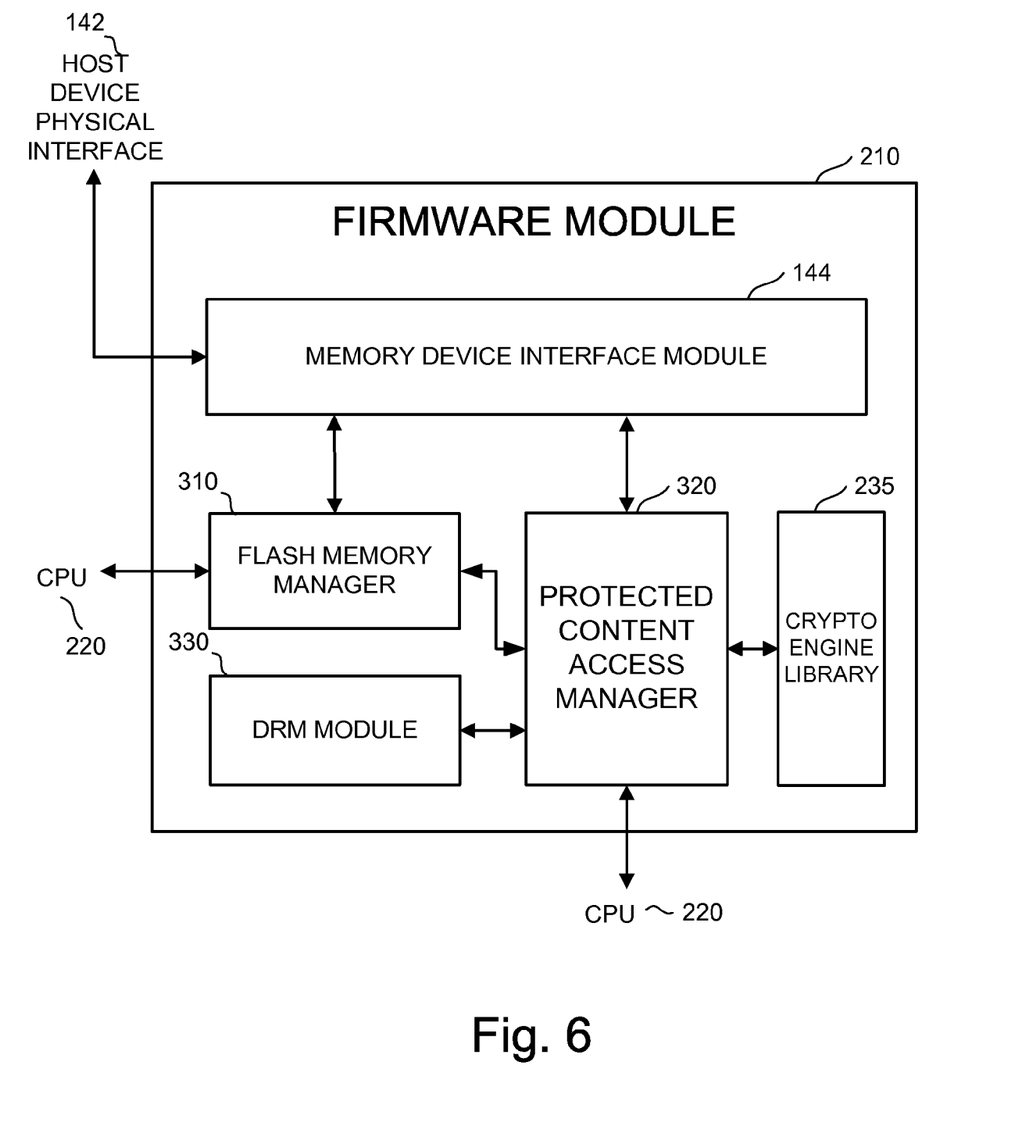
FIG. 6 is a block diagram depicting one embodiment of a firmware module for a secure memory device.

FIG. 6 depicts the details of one embodiment for the firmware module 210. The firmware module 210 contains a memory device interface module 144, a flash memory manager 310, a protected content access manager 320, a crypto engine library 235, and a DRM (digital rights management) module 330. The memory device interface module 144 contains the hardware and software for interfacing the secure memory device 145 with the host device 100. The hardware components for the memory device interface module 144 can include components for any type of interface, such as a Universal Serial Bus (USB), Secure Digital (SD), or Compact Flash (CF) interface. The flash memory manager 310 contains the software that programs the CPU 220 to access or store content in the secure memory device 145 The protected content access manager 320 contains the software that programs the CPU 220 to access or store protected content using permissions for the protected content and may program the CPU 220 to access or store the protected content based on the permissions using the DRM module 330. The protected content access manager 320 may also use the crypto engine library 235, which stores the information needed to encrypt content using a session key or a CEK. Both the flash memory manager 310 and the protected content access manager 320 access and store content for the host device through the device driver 140 on the host device.

The flash memory manager 310 controls access and storage of unprotected content in the secure memory device 145 using the CPU 220. When a request to save unprotected content is received from the host device through the device driver 140, the flash memory manager 310 will save the content in the appropriate location according to the host file system 130. When a request to access unprotected content is received through the host device file system 130 via the device driver 140, the flash memory manager 310 will access the content from the appropriate location using the host file system according to the permissions stored for that content. The flash memory manager 310 also provides access to the protected content access manager 320 when the application or application launcher 105 tries to access protected content in the secure memory device 145.

The protected content access manager 320 controls access and storage of protected content in the secure memory device 145 using the CPU 220. The protected content access manager 320 manages the reference table 285 for permissions associated with the protected content. The protected content access manager 320 uses the secure file system 135 shown in FIG. 1 to access or store protected content. For example, when a request to save protected content is received from the host device through the device driver 140, the file system filter DLL will use the file system filter crypto library 168 to encrypt the protected content using a session key associated with the content if the content should be sent through a secure channel 155. The encrypted content is then sent to the secure memory device 145 through the secure channel 155 and decrypted at the secure memory device 145 with the memory device crypto engine 160 using the session key and the appropriate cryptographic scheme from the crypto engine library 235. The decrypted content is then encrypted by the memory device crypto engine 160 using a CEK for the content. The content encrypted using the CEK is saved in the appropriate location according to the secure file system 135. Any information associated with the content is also saved in the content header using the reference table, such as the CEK or any other permissions. For protected content sent through an open channel, a similar method for transferring the content is performed but without the session key encryption for the secure channel 155. When a request to access protected content is received from the host device through the device driver 140, the protected content access manager 320 will access the content from the appropriate location using the secure file system 135 according to the permissions stored for that content and provide the content to the host storage manager 110 on the host device 100 through either a secure channel 155 or an open channel 150. The protected content access manager 320 will access and store content through the flash memory manager 310 once the appropriate permissions are determined by the protected content access manager 320.

The protected content access manager 320 may also use the DRM module 330 to provide access to content based on permissions associated with the content, such as copyright permissions for example. The DRM module can support any particular DRM technology, such as OMA DRM, MS DRM, etc.

The crypto engine library 235 contains the cryptographic schemes that may be used for encrypting the content with a CEK or a session key within the secure memory device 145. When content should be encrypted or decrypted in the secure memory device 145, the protected content access manager 320 will access the appropriate cryptographic scheme from the crypto engine library 235. The cryptographic schemes can be any of the known schemes, such as AES, DES, 3DES, SHA-1, PKI, key pair generation, etc.

Figure 7:
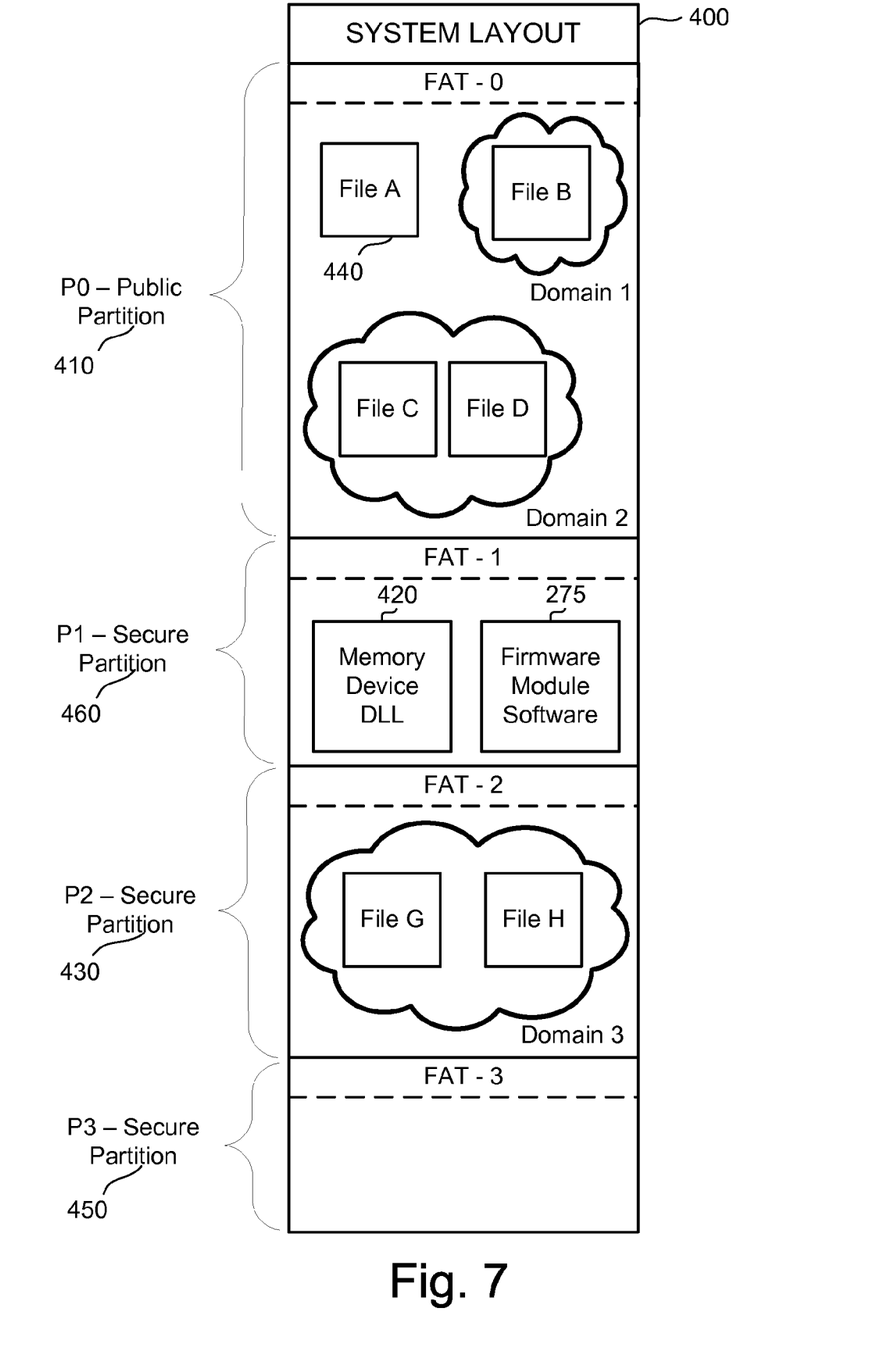
FIG. 7 depicts one example of partitions within a secure memory device.

FIG. 7 depicts an example of a system layout 400 for the secure memory device 145. The system layout 400 contain all of the memory partitions in the secure memory device 145. That is, the system layout 400 is made up of the public partitions 240 and the secure partitions 250 shown in FIG. 5. The secure memory device 145 may have any number of public or secure partitions. As previously described, a public partition is detectable and openly accessible to a user or a host device. Unprotected content stored in a public partition can be accessed without authentication. However, protected content stored in a public partition must be accessed only after successful authentication. A secure partition is a hidden partition that is undetectable to a user or a host device. Any application or application launcher attempting to open content in a secure partition must first be authenticated.

When protected content is saved to the secure memory device 145, the protected content access manager 320 organizes the content according to the permissions associated with the content and the content is then stored by the flash memory manager 310. Public and secure partitions may have domains that contain groups of protected content having the same permissions. Each domain is associated with one CEK for decrypting content from or encrypting content to that domain. Any application or application launcher having the appropriate permissions for opening content within a domain may also be able to open other content stored in the same domain.

Public partition P0 410 in FIG. 7 contains two domains, Domain 1 and Domain 2. All content stored in Domain 1 will use one CEK for encrypting and decrypting content. All content stored in Domain 2 will use another CEK for encrypting and decrypting the content. Because the public partition P0 is not hidden and is openly accessible, protected content contained within a domain may be seen and possibly accessed but the content may not be read unless the content is properly decrypted using the appropriate CEK. Therefore, it is possible that content in a domain may be corrupted by an unauthorized user but the content may not be read.

File A 440 in public partition P0 410 is not contained within a domain so it does not have a CEK associated with it. Therefore, any user may access and read File A 440.

Secure partition P1 460 contains the file system filter DLL 420 and the firmware module software 275. However, this is simply an example of how software for the secure memory device 145 may be stored. As previously described, the file system filter DLL 420 may be pre-installed on the host device or the operating system for the host device. The firmware module software 275 is the software for operating the firmware module 210 in the secure memory device 145.

Secure partition P2 430 contains File G and File H, both within Domain 3 490. Domain 3 is associated with a CEK for encrypting and decrypting the content. For example, if an application or application launcher attempts to access File G in Domain 3, the application or application launcher must first be authenticated. Once authenticated, the application or application launcher may access File G using the CEK for Domain 3 and may also access File H within Domain 3.

Secure partition P3 450 shows an empty partition that may be used to store any content.

Figure 8:
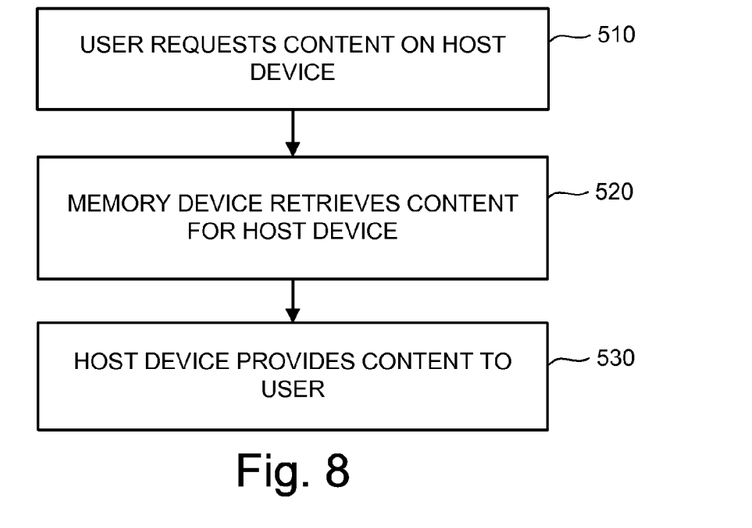
FIG. 8 is a flow chart describing a process for providing content to a user.

FIG. 8 is a flow chart of a process for operating the host device 100 with the secure memory device 145 (step 180 of FIG. 2). More specifically, FIG. 8 describes content requested by a user is accessed. In step 510, a user requests content stored on the secure memory device 145 via a host device 100. The user may request the content through an application or an application launcher 105 on the host device. In step 520, the secure memory device 145 retrieves the requested content for the host device 100, as explained in more detail below. In step 530, the host device 100 provides the retrieved content to the user.

Figure 9:
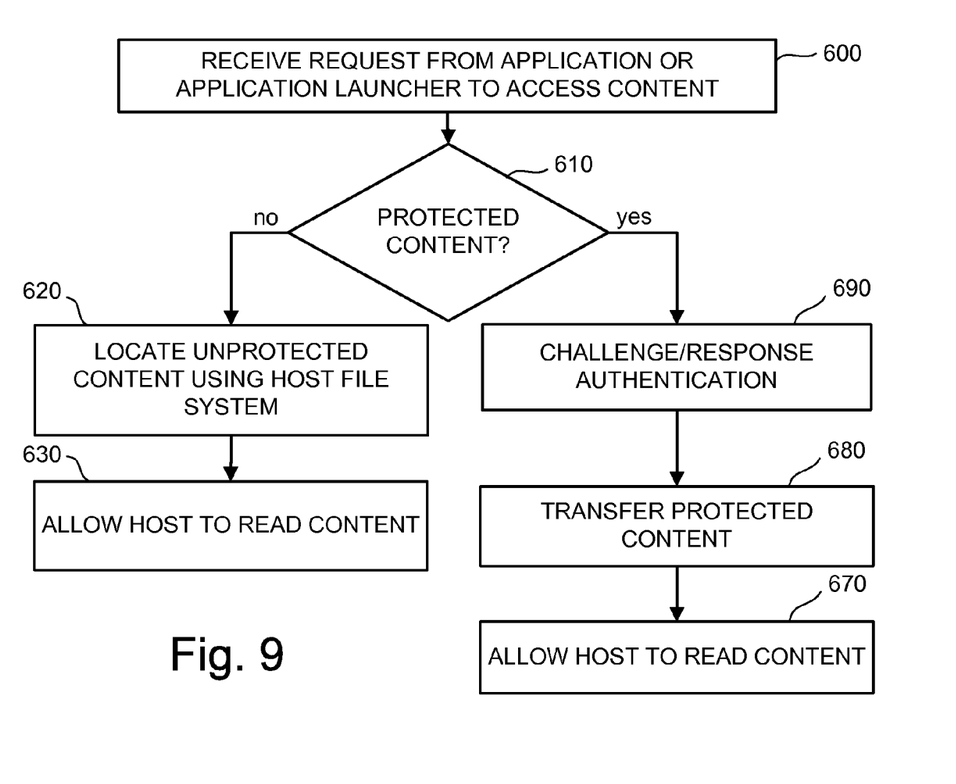
FIG. 9 is a flow chart describing one embodiment of a process for accessing either unprotected or protected content.

FIG. 9 is flow chart of a detailed process for retrieving content from the secure memory device 145 (step 520 of FIG. 8) and providing the content to the host device 100 for the user (step 530 of FIG. 8). In step 600, the file system filter interface layer 125 for the secure memory device 145 receives a request to access content. The request is received from an application or application launcher 105 in response to the request to access content received from the user in step 510 of FIG. 5.

In step 610, the file system filter interface layer 125 intercepts control of file system operations on the host device by intercepting control of the host file system and first determining whether the content requested is protected in the secure memory device 145. The file system filter interface layer 125 determines whether the content is protected by accessing reference table 285 to check the content header containing information for content stored on the secure memory device 145.

If the file system filter interface layer 125 determines that the requested content is unprotected in the secure memory device 145, the file system filter interface layer 125 will use the host file system 130 to locate the unprotected content stored in the secure memory device 145 (step 620).

In step 630, the flash memory manager 310 will allow the host device 100 to read the unprotected content by sending the unprotected content to the application or application launcher 105 on the host device 100 through an open channel 150.

If in step 610 the file system filter interface layer 125 determines that the content is protected, the file system filter 125 will indicate to the application or application launcher 105 that the application or application launcher 105 needs to be authenticated because the content is protected. The application or application launcher 105 will authenticate by performing a challenge/response authentication (step 690). More detail about this step is described in FIGS. 10 and 11 below.

Once the application or application launcher 105 is successfully authenticated, the protected content will be transferred to the host device (step 680). More detail about how the protected content may be transferred is described in FIG. 12 below.

After the content is transferred, the application or application launcher 105 on the host device may read the protected content (step 670). More detail about how the content is read is described in FIG. 13 below.

Figure 10:
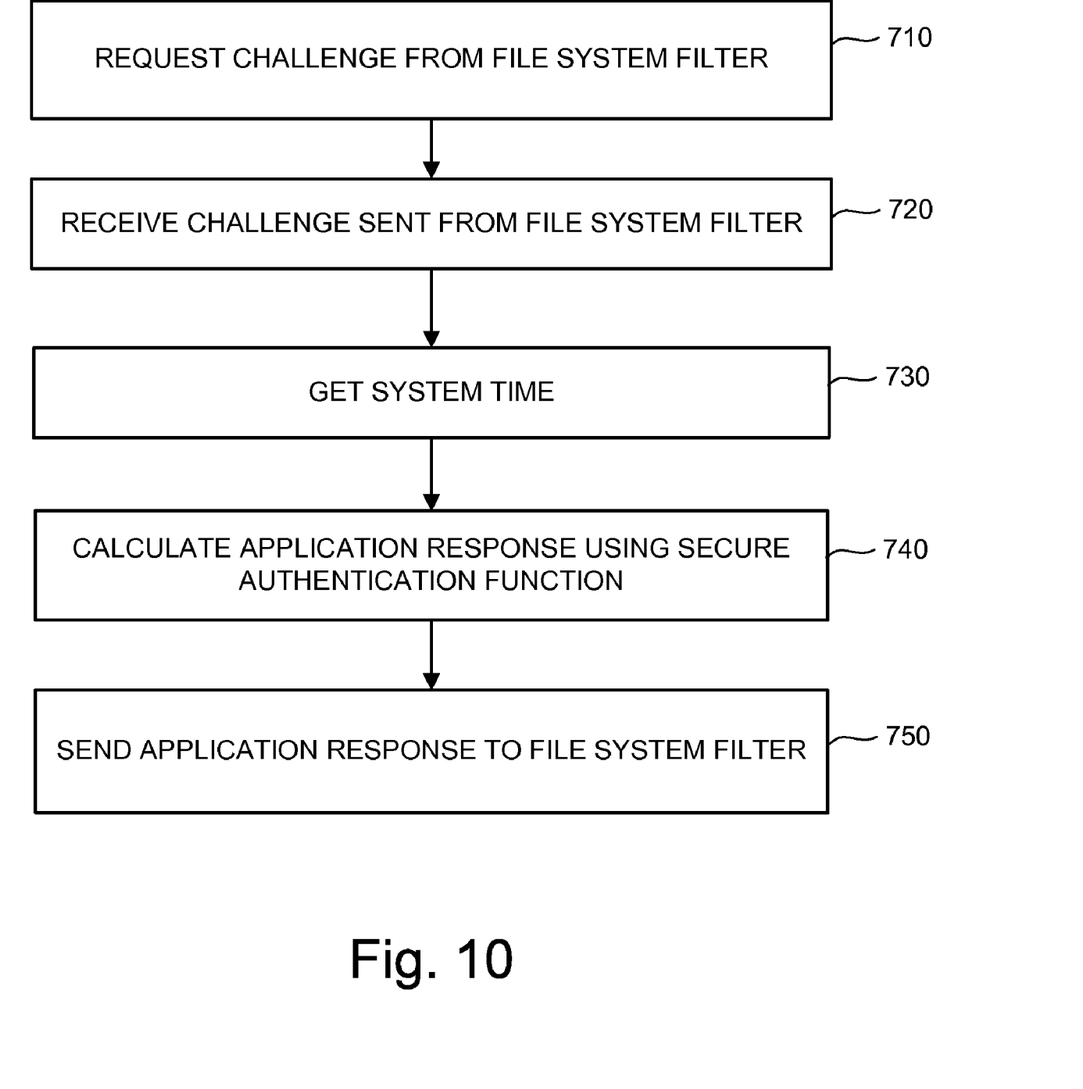
FIG. 10 is a flow chart describing one embodiment of a process for initiating authentication.

FIG. 10 is a flow chart of a process performed by an application or application launcher 105 for initiating the challenge/response authentication in step 690 of FIG. 9. In step 710, after the application or application launcher 105 is informed that the content requested is protected, the application or application launcher 105 requests a challenge from the file system filter interface layer 125 for the secure memory device 145. The challenge is a random number generated by the file system filter interface layer 125 using the file system filter crypto library 168. The application or application launcher 105 is programmed to call an authentication API in the file system filter interface layer 125 for the file system filter DLL 420 in order to request the challenge. The form of the authentication API may be, for example, FSF_GetChallenge(char*AppID, uchar*challenge), where char*AppID is a unique application or application launcher identifier associated with the application or application launcher 105 requesting the challenge, and uchar*challenge is the random number generated by the file system filter interface layer 125 using the file system filter crypto library 168. When the application or application launcher 105 calls the FSF_GetChallenge API, the application or application launcher 105 will provide the file system filter 125 with its unique identifier, and the application or application launcher 105 will receive the random number generated by the file system filter interface layer 125 (step 720) using the file system filter crypto library 168.

For applications or application launchers that are not programmed to call the proper authentication APIs for access, the content may not be read by those applications or application launchers. For example, if an application or application launcher that is not programmed to call the proper access APIs somehow manages to access content anyway, the content might not be readable by the application or application launcher because the content may be encrypted.

In step 730, the application or application launcher 105 will get the system time from the host device 105. In one embodiment, the system time can be a system time kept by the operating system of the host device 100. The system time may be retrieved at the time the application or application launcher 105 receives the challenge from the file system filter interface layer 125.

In step 740, the application or application launcher 105 will calculate an application response using a secure authentication function. The application or application launcher 105 is programmed to use a particular secure authentication function. In one embodiment, each application or application launcher 105 on the host device 100 is programmed to use a secure authentication function that is unique to the application or application launcher 105. The host device crypto engine 185 will provide the crypto functions to the application or application launcher 105 to generate the response to the challenge.

The secure authentication function can be any crypto function, such as an AES crypto function. The application or application launcher 105 will input the challenge received from the file system filter interface layer 125 in step 720 and the system time acquired in step 730 into the secure authentication function to produce an application response (step 740). The application response can be calculated using the host device crypto engine 185 on the host device 100.

Once an application response is calculated using the secure authentication function, the application or application launcher 105 calls another API to send the application response to the file system filter interface layer 125 (step 750). The form of an API for sending the application response to the file system filter interface layer 125 may be, for example, FSF_Launch_By_Path(char*AppID, uchar*response, char*path), where char*AppID is the unique identifier for the application or application launcher 105, uchar*response is the application response produced using the secure authentication function in step 740, and char*path is the path where the requested protected content is saved in the secure memory device 145.

Figure 11:
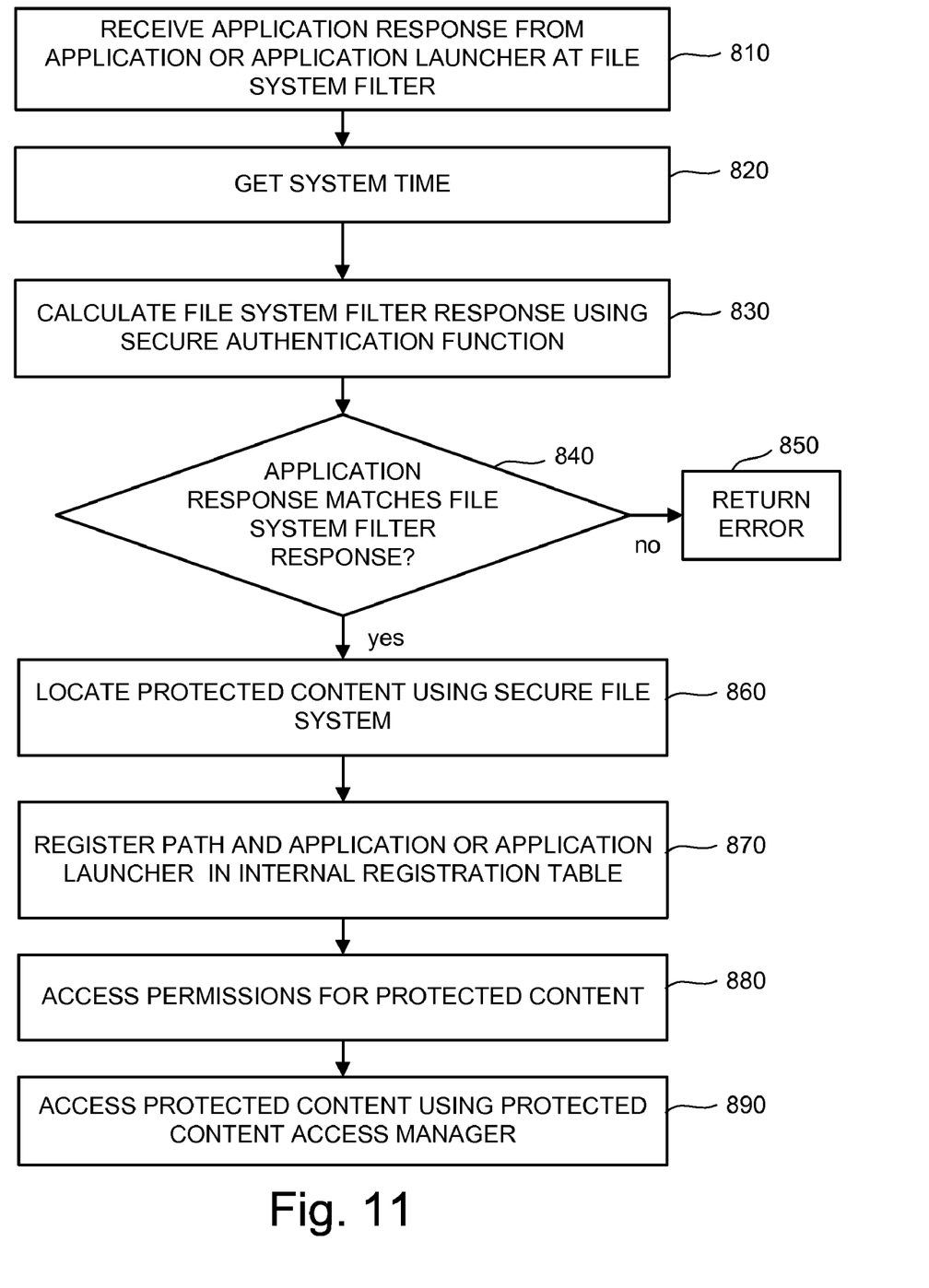
FIG. 11 is a flow chart describing one embodiment of a process for accessing protected content through authentication.

FIG. 11 is a flow chart depicting a process performed by the file system filter interface layer 125 for completing the challenge/response authentication and accessing the protected content (step 690 of FIG. 9). Once the application or application launcher 105 sends the application response to the file system filter interface layer 125 in step 750 of FIG. 10, the file system filter interface layer 125 receives the application response in step 810.

In step 820, the file system filter interface layer 125 will get the system time from the host device 100. In one embodiment, the system time can be a system time kept by the operating system of the host device 100. The file system filter interface layer 125 will get the system time for a window of times ranging from the time the challenge was sent to the application or application launcher 105 through a period of time subsequent to the time the challenge was sent. This is done to compensate for any allowable delay the application or application launcher 105 may experience in receiving the challenge, calculating the application response, and sending the application response to the file system filter interface layer 125. The window of times can be any predetermined amount of time the application response can be received. The interval between the times in the window of times can be any increment of time (e.g. microseconds).

In step 830, the file system filter interface layer 125 will calculate a file system filter response, which includes a set of responses calculated for the window of times retrieved in step 820. The file system filter interface layer 125 will calculate the file system filter response using the same secure authentication function the application or application launcher 105 used to calculate the application response (step 740 of FIG. 10). The file system filter interface layer 125 determines which secure authentication function to use based on the application or application launcher identifier provided by the application or application launcher 105 through the API for sending the application response. The file system filter interface layer 125 will use the application or application launcher identifier to look up the appropriate authentication algorithm (i.e. secure authentication function) in the file system filter crypto library 168.

The file system filter interface layer 125 will input the same challenge sent to the application or application launcher 105 and a system time into the secure authentication function to produce a file system filter response. The file system filter response can be calculated using the file system filter crypto library 168 for the secure memory device 145 or any crypto engines available on the host device 100. The file system filter interface layer 125 will perform this calculation for all of the times acquired in step 820.

In step 840, the file system filter interface layer 125 will compare the application response received in step 810 to the file system filter responses calculated in step 830. If the application response does not match one of the file system filter responses calculated in step 830, the file system filter interface layer 125 will return an error to the application or application launcher 105 in step 850.

If the application response matches one of the file system filter responses calculated in step 830 for the window of times, the file system filter interface layer 125 will use the secure file system 135 to locate the protected content stored in the secure memory device 145 (step 860).

Once the protected content is located using the secure file system 135, the path of the content and the application or application launcher 105 accessing the content is registered in an internal registration table maintained by the file system filter interface layer 125 (step 870). The internal registration table contains information for authenticated applications and application launchers. For applications and application launchers that have been successfully authenticated with the file system filter interface layer 125, the file system filter interface layer 125 will record information in the internal registration table, such as the application or application launcher identifier, the last challenge sent to the application or application launcher, a time out period for the application or application launcher indicating an amount of time that the authenticated application or application launcher can remain registered in the internal registration table, and the path for the protected content. The internal registration table is used to keep track of the authenticated applications and application launchers and the path for the protected content they were authorized to access so that the authenticated applications do not have to re-authenticate when accessing other content stored in the same path (i.e. the same domain). However, for each new path an authenticated application or application launcher tries to access, the challenge/response authentication process must be performed again. After an authenticated application or application launcher has been registered in the internal registration table for a certain amount of period (i.e. the time out period), the file system filter will unregister the authenticated application or application launcher so that the challenge/response authentication must be performed again when accessing content stored in the path.

In step 880, the permissions associated with the requested protected content are accessed by the protected content access manager 320. The protected content access manager 320 will access the permissions for the protected content. For example, a CEK for decrypting the protected content stored in the secure memory device 145 or a session key may be accessed.

In step 890, the protected content will be accessed using the protected content access manager 320 based on the location determined in step 860. The protected content access manager 320 will use the flash memory manager 310 to access the appropriate location for the protected content.

Figure 12:
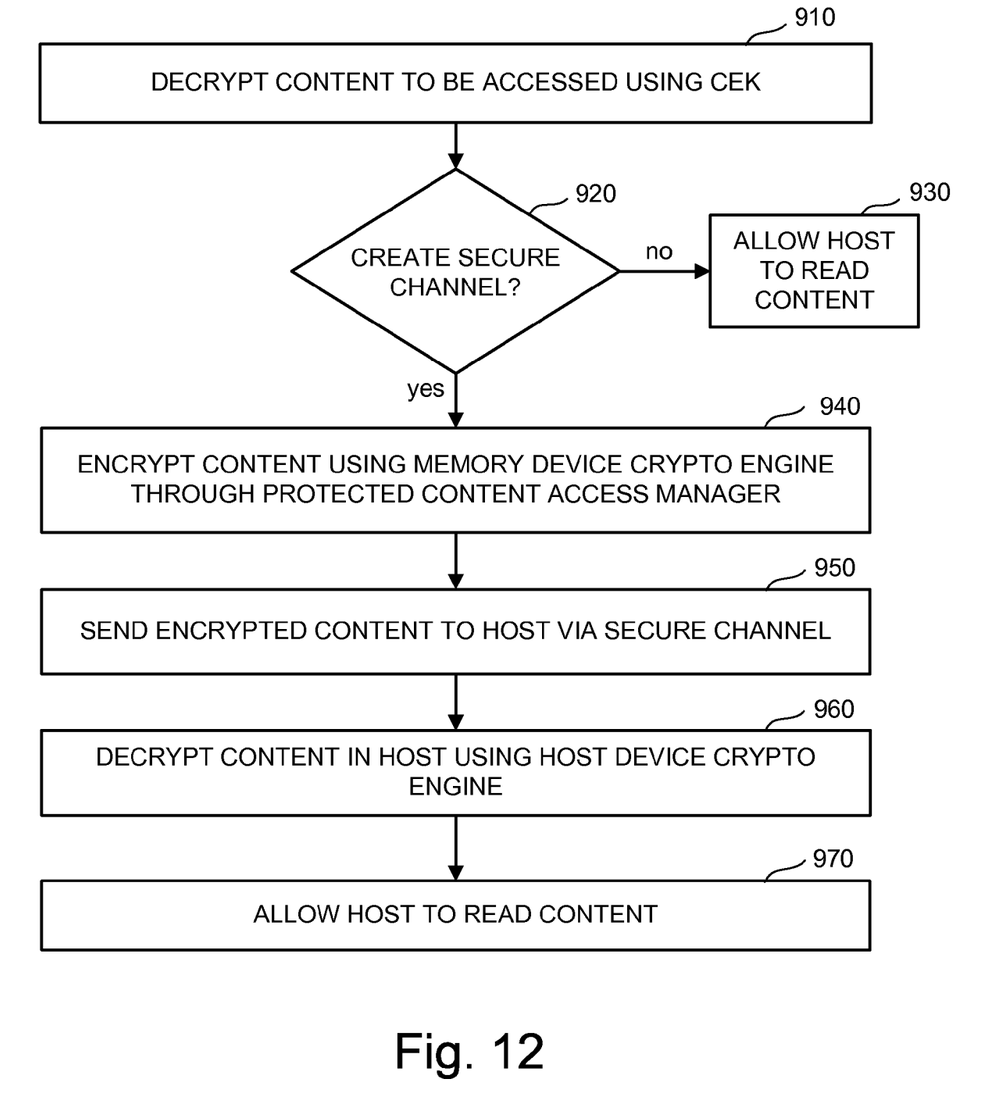
FIG. 12 is a flow chart describing one embodiment of a process for transferring protected content.

FIG. 12 is a flow chart of a process performed by the secure memory device 145 for transferring the protected content to the user (step 680 of FIG. 9) once it is accessed in step 890 of FIG. 11. In step 910, the accessed protected content is decrypted by the memory device crypto engine 160 using the CEK retrieved in step 880 of FIG. 11.

In step 920, the protected content access manager 320 will determine whether a secure channel 155 is required for transferring content to the host device 100. If the permissions associated with the protected content indicates that the protected content should be sent to the host device 100 through an open channel 150, the protected content access manager 320 will allow the host to read the protected content by sending the protected content to the application or application launcher 105 on the host device 100 through the host storage manager 110 without having to decrypt the content (step 930). More detail about how the application or application launcher 105 reads the protected content is described below in the description for FIG. 13.

If the protected content is associated with a session key indicating that the protected content should be sent to the host device 100 through a secure channel 155, the protected content access manager 320 will direct the memory device crypto engine 160 to encrypt the accessed protected content using the session key associated with the protected content before the content is transferred to the host device 100 (step 940). The protected content access manager 320 will then send the encrypted content to the host storage manager 110 on the host device 100 through a secure channel 155 (step 950). Once the encrypted protected content is sent to the host device 100, the protected content will be decrypted through the host device crypto engine 185 using the same session key (step 960). The application or application launcher 105 on the host device 100 will then be able to read the decrypted protected content (step 970). More detail about how the application or application launcher 105 reads the protected content is described below in the description for FIG. 13.

Figure 13:
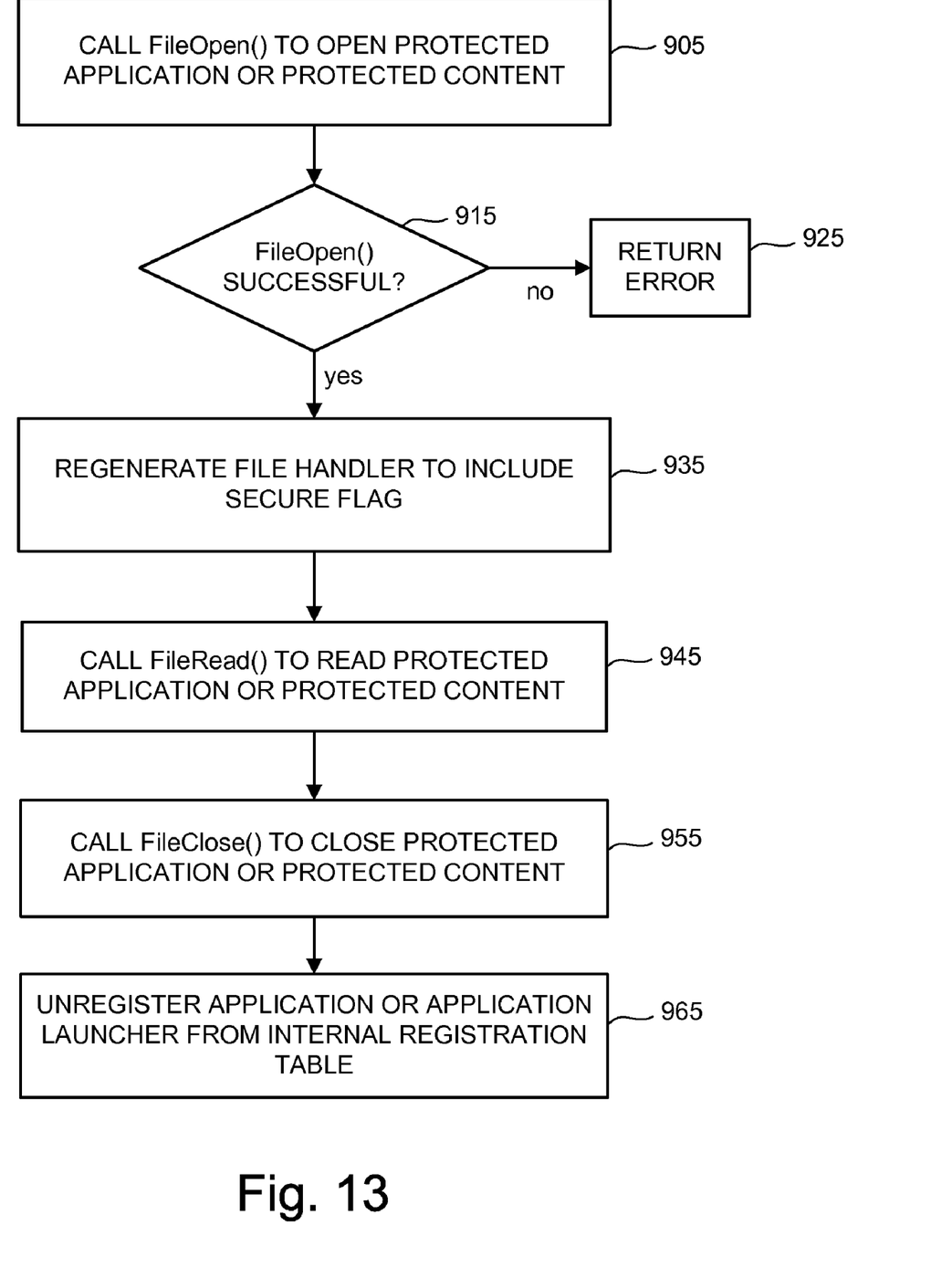
FIG. 13 is a flow chart describing one embodiment of a process for opening protected content on the host device.

FIG. 13 is a flow chart explaining the details of how the application or application launcher 105 may read the protected content (steps 930 and 970 of FIG. 12). In step 905, the application or application launcher 105 will call an API for opening the protected content, such as the FileOpen() API.

In step 915, the file system filter interface layer 125 will determine whether the protected content was successfully opened using the FileOpen() API. If the protected content is not successfully opened using the FileOpen() API, the file system filter interface layer 125 will return an error to the application or application launcher 105 (step 925).

Typically, when content is accessed or stored through an application or application launcher 105, a file handler is used by the file system filter interface layer 125 to handle reading and writing operations for the content. If the file system filter interface layer 125 determines that the protected content has been successfully opened using the FileOpen() API, the file system filter interface layer 125 will regenerate the file handler for the protected content to include a secure flag (step 935). The secure flag can be any unique indicator indicating that the application or application launcher 105 has been authenticated for access to the protected content. The regenerated file handler will be used to access other content stored within the same path of the accessed protected content. For example, if the application or application launcher 105 attempts to access other content stored in the same domain as the protected content accessed, the file system filter interface layer 125 will check the file handler to see if there is a secure flag indicating that other content within that domain may be accessed.

In step 945, the application or application launcher 105 will call the FileRead() API to read the protected content. The user may then read the protected content through the application or application launcher 105.

When the protected content is no longer needed, the application or application launcher 105 will call the FileClose() API to close the protected content (step 955). This may occur if the user closes the protected content, for example.

Once the protected content is closed, the file system filter interface layer 125 will unregister the application or application launcher 105 from the internal registration table by deleting the record for the authenticated application associated with the protected content (step 965). In one embodiment, if the time out period indicated in the internal registration table has passed before the application or application launcher 105 has closed the content, the file system filter interface layer 125 will unregister the application of application launcher 105. In one embodiment, if the time out period has not yet passed, the file system filter interface layer 125 may not clean the internal registration table until the application or application launcher 105 has closed the content, and step 965 may be omitted.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A non-volatile storage device that is coupleable to a host device, the non-volatile storage device comprising:
   a communication interface;
   non-volatile storage elements, the non-volatile storage elements configured to store processor readable code, the processor readable code configured to program one or more host processors situated on the host device to, while the host device is operatively coupled to the non-volatile storage device:
   intercept a request to access requested content stored in the non-volatile storage elements;
   send a challenge to a software entity on the host device in response to the request;
   receive a first response from the software entity in response to the challenge sent to the software entity;
   calculate a second response using the challenge; and
   permit the software entity to access the requested content conditioned on the first response matching the second response; and one or more processors that are configured to:

send the processor readable code to the host device via the communication interface; and
send the requested content to the host device through the communication interface conditioned on the first response matching the second response.

2. The non-volatile storage device of claim 1, further comprising a cryptographic engine, the cryptographic engine configured to decrypt the requested content using a content encryption key stored in the non-volatile storage elements.

3. The non-volatile storage device of claim 1, further comprising a cryptographic engine, the cryptographic engine configured to encrypt the requested content using a session key associated with the content before the requested content is transferred to the host device.

4. The non-volatile storage device of claim 1, wherein the one or more processors are further configured to access permissions associated with the requested content and to send the requested content to the host device based on the permissions.

5. The non-volatile storage device of claim 1, wherein the processor readable code is configured to program the one or more host processors to calculate the second response using a cryptographic function during a window of times, the window of times including a first system time when the challenge is sent and a predetermined number of times after the first system time.

6. The non-volatile storage device of claim 5, wherein the processor readable code is configured to program the one or more host processors to return an error to the software entity in response to the first response not being received within the window of times.

7. The non-volatile storage device of claim 1, wherein the processor readable code is configured to program the one or more host processors to return an error to the software entity in response to the first response failing to match the second response.

8. The non-volatile storage device of claim 1, wherein the second response includes a plurality of responses calculated for the window of times, and wherein the first response matching the second response includes the first response matching one of the plurality of responses.

9. A data storage device comprising:
a communication interface;
a non-volatile memory storing processor readable code and content; and
a controller coupled to the non-volatile memory and to the communication interface, wherein while the data storage device is operatively coupled to a host device, the controller is configured to send the processor readable code that is stored in the non-volatile memory to a host processor at the host device, wherein the processor readable code is executable by the host processor to cause the host processor to:
intercept a request to access the content stored in the non-volatile memory, the request issued by a software entity at the host;
send a challenge to the software entity at the host device in response to the intercepted request;
receive a first response to the challenge from the software entity;
calculate a second response using the challenge; and
provide the software entity with access to the content conditioned on the first response matching the second response;
wherein the controller is configured to access the content from the non-volatile memory and to send the content accessed from the non-volatile memory to the host device via the communication interface conditioned on the first response matching the second response.

10. The data storage device of claim 9, further comprising a cryptographic engine, the cryptographic engine configured to decrypt the content using a content encryption key stored in the non-volatile memory.

11. The data storage device of claim 9, further comprising a cryptographic engine, the cryptographic engine configured to encrypt the content using a session key associated with the content before the content is accessed by the host device.

12. The data storage device of claim 9, further comprising a cryptographic engine, wherein the challenge includes a random number generated by the cryptographic engine.

13. The data storage device of claim 9, wherein the second response is calculated using a cryptographic function within a window of times, wherein the window of times includes a first system time when the challenge is sent and a predetermined number of times subsequent to the first system time.

14. The data storage device of claim 13, wherein the processor executable code is executable by the host processor to cause the host processor to return an error from the host processor to the software entity in response to the host processor failing to receive the first response within the window of times.

15. The data storage device of claim 9, wherein, the processor executable code is executable by the host processor to cause the host processor to return an error from the host processor to the software entity in response to the first response failing to match the second response.

16. The data storage device of claim 9, wherein the second response includes a plurality of responses calculated for the window of times, and wherein the first response matching the second response includes the first response matching one of the plurality of responses.

17. A removable data storage device comprising:
a non-volatile memory storing processor readable code and content; and
a controller coupled to the non-volatile memory, wherein while the removable data storage device is operatively coupled to a host device, the controller is configured to:
send the processor readable code that is stored in the non-volatile memory to the host device, wherein the processor readable code is executable by a host processor of the host device to cause the host processor to:
intercept a request from a software entity to access the content stored in the non-volatile memory;
send a challenge to the software entity in response to the intercepted request;
receive a first response to the challenge from the software entity;
calculate a second response using the challenge; and
provide access by the software entity to the content conditioned on the first response matching the second response; and
send the content from the non-volatile memory to the host device conditioned on the first response matching the second response.

18. The removable data storage device of claim 17, wherein the second response includes a plurality of responses calculated for a window of times, and wherein the first response matching the second response includes the first response matching one of the plurality of responses.

19. The removable data storage device of claim 17, wherein the removable data storage device is a flash memory device.

* * * * *